(12) United States Patent
Mellander et al.

(10) Patent No.: US 12,005,418 B2
(45) Date of Patent: Jun. 11, 2024

(54) REACTOR VESSEL FOR BIOMASS MATERIAL

(71) Applicant: VALMET AB, Sundsvall (SE)

(72) Inventors: Stefan Mellander, Alnö (SE); Johan Carlsson, Alnö (SE); Lars Fredriksson, Alnö (SE); Francois Lambert, Sundsvall (SE)

(73) Assignee: VALMET AB, Sundsvall (SE)

( * ) Notice: Subject to any disclaimer, the term of this patent is extended or adjusted under 35 U.S.C. 154(b) by 888 days.

(21) Appl. No.: 17/049,196

(22) PCT Filed: Mar. 29, 2019

(86) PCT No.: PCT/SE2019/050285
§ 371 (c)(1),
(2) Date: Oct. 20, 2020

(87) PCT Pub. No.: WO2019/209153
PCT Pub. Date: Oct. 31, 2019

(65) Prior Publication Data
US 2021/0237024 A1 Aug. 5, 2021

(30) Foreign Application Priority Data
Apr. 25, 2018 (SE) .................................. 1850491-0

(51) Int. Cl.
*B01J 19/20* (2006.01)
*B01J 3/04* (2006.01)
(Continued)

(52) U.S. Cl.
CPC .............. *B01J 19/20* (2013.01); *B01J 3/042* (2013.01); *D21C 1/02* (2013.01); *D21C 1/04* (2013.01);
(Continued)

(58) Field of Classification Search
CPC ......... B01J 3/00; B01J 3/03; B01J 3/04; B01J 3/042; B01J 19/00; B01J 19/18;
(Continued)

(56) References Cited

U.S. PATENT DOCUMENTS 3,407,028 A 10/1968 Huston
2007/0278233 A1 12/2007 Albert
(Continued)

FOREIGN PATENT DOCUMENTS

CN 101768538 A 7/2010
CN 203080350 U 7/2013
(Continued)

OTHER PUBLICATIONS

Chinese Office Action, Application No. 201980026081.3, dated Oct. 8, 2021, 8 pages.
(Continued)

*Primary Examiner* — Natasha E Young
(74) *Attorney, Agent, or Firm* — Foley & Lardner LLP

(57) ABSTRACT

A reactor vessel (1) for biomass material, wherein said reactor vessel (1) is a pressurized reactor vessel, said reactor vessel being elongated and comprising: a substantially tubular vessel part (3); two gables (5a, 5b) connected one to each end (19a, 19b) of the tubular vessel part (3), hereby enclosing a vessel internal compartment (7); and a material transporting screw (8) comprising a central shaft (9) provided within the vessel internal compartment (7) extending between the two gables (5a, 5b) along a central axis (A) of the reactor vessel (1), wherein said material transporting screw further comprises screw flight (11) provided around the shaft (9), wherein said material transporting screw is configured for transporting the biomass material through the reactor vessel, wherein both gables (5a, 5b) are inwardly dished.

20 Claims, 1 Drawing Sheet

(51) Int. Cl.
  *D21C 1/02* (2006.01)
  *D21C 1/04* (2006.01)
  *D21C 7/06* (2006.01)
  *D21C 7/08* (2006.01)
(52) U.S. Cl.
  CPC .................. *D21C 7/06* (2013.01); *D21C 7/08* (2013.01); *B01J 2219/00051* (2013.01); *B01J 2219/182* (2013.01); *B01J 2219/1943* (2013.01)
(58) Field of Classification Search
  CPC .................... B01J 19/20; B01J 2219/00; B01J 2219/00049; B01J 2219/00051; B01J 2219/18; B01J 2219/182; B01J 2219/19; B01J 2219/194; B01J 2219/1941; B01J 2219/1943; B65G 33/00; B65G 33/08; B65G 33/14; D21C 1/00; D21C 1/02; D21C 1/04; D21C 7/00; D21C 7/06; D21C 7/08; F17C 1/00
  See application file for complete search history.

(56) References Cited

U.S. PATENT DOCUMENTS

2013/0301375 A1 11/2013 Stephan et al.
2016/0312319 A1* 10/2016 Kusuda ............... B01F 27/1921

FOREIGN PATENT DOCUMENTS

| | | |
|---|---|---|
| CN | 203248710 U | 10/2013 |
| FR | 2278707 A1 | 2/1976 |
| WO | WO 2015/027613 A1 | 3/2015 |

OTHER PUBLICATIONS

Extended European Search Report, Application No. 19793657.8, dated Nov. 26, 2021, 8 pages.

* cited by examiner

REACTOR VESSEL FOR BIOMASS MATERIAL

The present application is a national phase entry under 35 U.S.C. § 371 of International Application No. PCT/SE2019/050285, now WO 2019/209153, filed on Mar. 29, 2019, which claims priority to Swedish Patent Application No. 5E1850491-0, filed on Apr. 25, 2018, the disclosures of which are hereby incorporated herein by reference.

TECHNICAL FIELD OF THE INVENTION

The present invention relates to a reactor vessel for biomass material.

BACKGROUND

Arrangements for pre-treatment or prehydrolysis of biomass is known in the art. Such arrangement may comprise one or more pressurized reactors in which the biomass is pretreated with steam at elevated pressure and temperature with or without the addition of chemicals.

Temperature and time are two important parameters in the kinetics of such a prehydrolysis treatment. In particular, it is preferable that the desired temperature is reached as fast as possible in order to get right kinetics and to avoid building an excessively large reactor. It is furthermore important that the heating of the biomass is as homogenous as possible, since a heterogeneous heating may lead to unreacted, low-reacted or even over-reacted material, which in turn may cause yield loss, formation of undesired by-products and/or problems in the downstream process.

A pressurized reactor vessel for pretreatment or prehydrolysis of biomass can be an elongated, horizontally provided vessel comprising an inlet in one end and an outlet in the other end. A material transporting screw is provided inside the vessel along a longitudinal central axis of the vessel. Said material transporting screw typically comprises a shaft extending along the longitudinal central axis throughout the whole vessel and a screw flight provided around the shaft in the form of a screw helix for transporting the material along the length of the vessel when the shaft is rotated. For higher capacity and higher pressure which may be needed in the pre-treatment of biomass, larger reactors are needed. For long reactors there may be problems with a deflection of the shaft of the material transporting screw. In order to avoid deflection of the shaft, the shaft diameter is made larger. However, by making the shaft diameter larger the effective internal volume of the vessel used for treating the material will be decreased.

SUMMARY

An object of the present invention is to provide an improved reactor vessel for biomass material.

A further object of the invention is to provide a reactor vessel for biomass material with optimized internal volume for treating the material.

A further object of the invention is to decrease the weight of the reactor vessel for biomass material without losing effective internal volume.

These objects are achieved in a reactor vessel according to claim 1.

According to one aspect of the invention a reactor vessel for biomass material is provided. Said reactor vessel is a pressurized reactor vessel, said reactor vessel being elongated and comprising:
- a substantially tubular vessel part;
- two gables connected one to each end of the tubular vessel part, hereby enclosing a vessel internal compartment; and
- a material transporting screw comprising a central shaft provided within the vessel internal compartment extending between the two gables along a central axis (A) of the reactor vessel, wherein said material transporting screw further comprises screw flight provided around the shaft, wherein said material transporting screw is configured for transporting the biomass material through the reactor vessel, wherein both gables are inwardly dished.

If the reactor vessel is a pressurized vessel the gables can be made much thinner if they are dished compared to if they are flat. This is because a dished gable resists the pressure from the pressurized reactor vessel much better. For large reactors with high internal pressure for treating the biomass material a flat gable could for example need to be as thick as 200 mm or even thicker and thus it becomes very heavy. A dished gable for the same size of reactor vessel can be made much thinner, maybe as thin as around 25 mm, and will therefore save a lot of weight. Hereby a reactor vessel which is easier to handle, move and transport is achieved. Furthermore, with both gables inwardly dished a material transporting screw provided along a central axis extending between the two gables inside the elongated reactor vessel can be made shorter. Such a material transporting screw is configured to be rotated around its central axis and is provided with a screw flight for transportation of biomass material through the reactor vessel. The material transporting screw needs to extend though the whole reactor vessel and protrude out through at least one of the gables for control of the shaft rotation. With inwardly dished gables instead of flat gables the shaft of the material transporting screw can be made shorter and a shorter shaft will be less prone to deflect and can therefore be made with a smaller diameter. A smaller diameter of the shaft will give a larger effective internal volume of the reactor vessel which is suitable for an effective process. The effective internal volume of the reactor vessel can be defined to be the volume inside the reactor vessel between an inlet and an outlet of said reactor vessel less the volume of the internal screw and its shaft. Said inlet is provided at a first position which is closer to a first end of said tubular vessel part than a second opposite end of said tubular vessel part and said outlet is provided at a second position which is closer to the second end than the first end of said tubular vessel part. By mechanical reasons there need to be a distance between the welds of the gables to the ends of the tubular vessel part and the inlet and the outlet. If the inlet and/or the outlet are positioned too close to the welds there will be a risk for breakage. This is also specified in the Pressure Equipment Directive, PED, and ASME. With inwardly dished gables the inlet and the outlet can be provided at the same distance from the ends of the tubular vessel part as with flat gables and since the internal effective volume is defined between the inlet and the outlet the internal effective volume will be increased due to the smaller diameter of the central shaft. Furthermore, with a smaller diameter of the shaft production costs will be decreased for both the shaft and also for sealings and bearings for the shaft mounting through the gables.

In one embodiment of the invention the central shaft is supported by bearings mounted on the gables in each end such that it can rotate around its longitudinal axis and the central shaft is protruding out through at least one of the gables. Said central shaft is further arranged to be connected to a rotation device configured for rotating said central shaft around its longitudinal axis.

In one embodiment of the invention it further comprises:
an inlet for receiving said biomass material into said vessel internal compartment, said inlet being provided centered to a first position, which is closer to a first end of said tubular vessel part than a second opposite end of said tubular vessel part; and
an outlet for discharging said biomass material out from the vessel internal compartment after having passed through the vessel internal compartment, said outlet being provided centered to a second position which is closer to the second end than the first end of said tubular vessel part.

In one embodiment of the invention said first position is provided at a first distance, d1, from the first end of the tubular vessel part and said second position is provided at a second distance, d2, from the second end of the tubular vessel part.

In one embodiment of the invention said first and second distances, d1, d2, are at least 1/20 of the total length of the reactor vessel.

In one embodiment of the invention a pressure within said vessel internal compartment is 5-50 bar (g). In one embodiment of the invention a pressure within said vessel internal compartment is 10-25 bar (g).

In one embodiment of the invention the reactor vessel is horizontally provided.

In one embodiment of the invention the reactor vessel is substantially cylindrical and at least 1 m in diameter and at least 6 m in length. In one embodiment of the invention the reactor vessel is substantially cylindrical and of at least 1.5 m in diameter and at least 8 m in length. In one embodiment of the invention the reactor vessel is substantially cylindrical and at least 2.5 m in diameter and at least 10 m in length.

In one embodiment of the invention a shape of the inwardly dished gables are hemispherical elliptical or spherical.

In one embodiment of the invention a top point of a first end vessel gable and a top point of a second end vessel gable, which top points are the parts of the dished gables provided furthest into the vessel internal compartment, are located between an inlet centerline and a first end of said tubular vessel part and between an outlet centerline and a second end of said tubular vessel part respectively, said inlet centerline passing through a center of an inlet of the reactor and being perpendicular to the central axis (A), said outlet centerline passing through a center of an outlet of the reactor and being perpendicular to the central axis (A).

In one embodiment of the invention a distance between the top point of the first end vessel gable and the first end of the tubular vessel and a distance between the top point of the second end vessel gable and the second end of the tubular vessel are at least 1/3 of a radius of the reactor vessel.

DETAILED DESCRIPTION OF EMBODIMENTS

According to the invention a reactor vessel for biomass material is provided. This could be a pressurized reaction vessel for treatment of biomass material.

Figure 1:
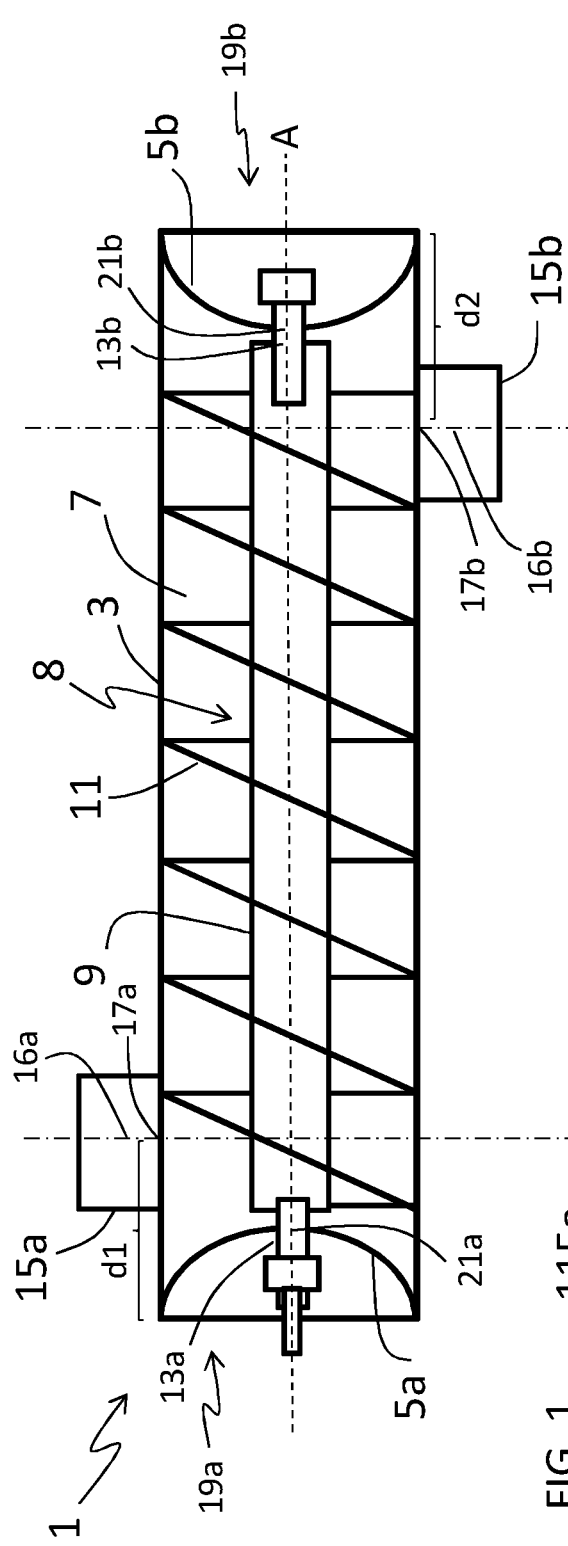
FIG. 1 shows schematically a reactor vessel with inwardly dished gables according to one embodiment of the invention.

FIG. 1 shows schematically a reactor vessel 1 according to one embodiment of the invention. The reactor vessel 1 is elongated and comprises a substantially tubular vessel part 3 and two gables 5a, 5b connected one to each end of the tubular vessel part 3, hereby enclosing a vessel internal compartment 7. A first end vessel gable 5a is connected to a first end 19a of the tubular vessel part 3 and a second end vessel gable 5b is connected to a second end 19b of the tubular vessel part 3. The reactor vessel 1 comprises further a material transporting screw 8 comprising a central shaft 9 provided within the vessel internal compartment 7 extending between the two gables 5a, 5b along a central axis, A, of the reactor vessel 1. According to the invention both said gables 5a, 5b are inwardly dished. Inwardly dished would mean that they are not flat but curved or cupped inwardly towards a center of the reactor vessel. A screw flight 11 is provided around the central shaft 9. The screw flight 11 can be in the form of a screw helix. The central shaft 9 together with the screw flight 11 is the material transporting screw 8, which is configured for transporting the biomass material through the reactor vessel 1.

The central shaft 9 is supported by bearings mounted on the gables 5a, 5b in each end such that it can rotate around its longitudinal axis. In this embodiment the central shaft 9 is provided with two protruding ends 13a, 13b, one provided in each end of the central shaft 9. These protruding ends 13a, 13b has a smaller diameter than the central shaft 9 and are therefore more suited for protruding through the gables 5a, 5b. One of the protruding ends 13a of the central shaft 9 is furthermore configured for connection to a rotation device. Hereby the central shaft 9 can be rotated around its longitudinal axis by the rotation device. The central shaft 9 is also sealed typically with stuffing boxes or mechanical sealings where it protrudes through the gables 5a, 5b.

The reactor vessel 1 according to this embodiment of the invention comprises further an inlet 15a for receiving said biomass material into said vessel internal compartment 7. The inlet 15a is provided centered to a first position 17a in the tubular vessel part 3 which first position 17a is closer to the first end 19a of said tubular vessel part 3 than the second opposite end 19b of said tubular vessel part. The reactor vessel 1 according to this embodiment comprises furthermore an outlet 15b for discharging said biomass material out from the vessel internal compartment 7 after having passed through the vessel internal compartment. The outlet 15b is provided centered to a second position 17b which is closer to the second end 19b than the first end 19a of said tubular vessel part 3. The first position 17a is provided at a first distance d1 from the first end 19a of the tubular vessel part 3 and said second position 17b is provided at a second distance d2 from the second end 19b of the tubular vessel part 3. In one embodiment of the invention said first and second distances d1, d2 are at least 1/20 of the total length of the tubular vessel part. In one embodiment of the invention d1 and d2 are at least 1/3 of a radius of the reactor vessel plus a distance from one side of the inlet/outlet 15a, 15b to a center 16a, 16b of the inlet/outlet, i.e. the distance the inwardly dished gables 5a, 5b are protruding into the reactor vessel, which can be at least 1/3 of a radius of the reactor vessel, plus half the size of the inlet/outlet, which can be the radius of the inlet/outlet if they are cylindrical. Hereby the inwardly dished gables 5a, 5b will not disturb the material transport through the reactor vessel.

The inlet 15a and outlet 15b should suitably not be provided too close to the ends of the tubular vessel part 3 and the welds of the gables due to mechanical reasons and risk of breakage and due to Pressure Equipment Directive, PED, and ASME as described above.

A reactor vessel according to the invention could be a pressurized reactor vessel for treatment of biomass material. A pressure within said vessel internal compartment can be 5-50 bar (g), i.e. pressure above atmospheric pressure or in one embodiment of the invention 10-25 bar (g). These reactor vessels are often horizontally provided.

Figure 2:
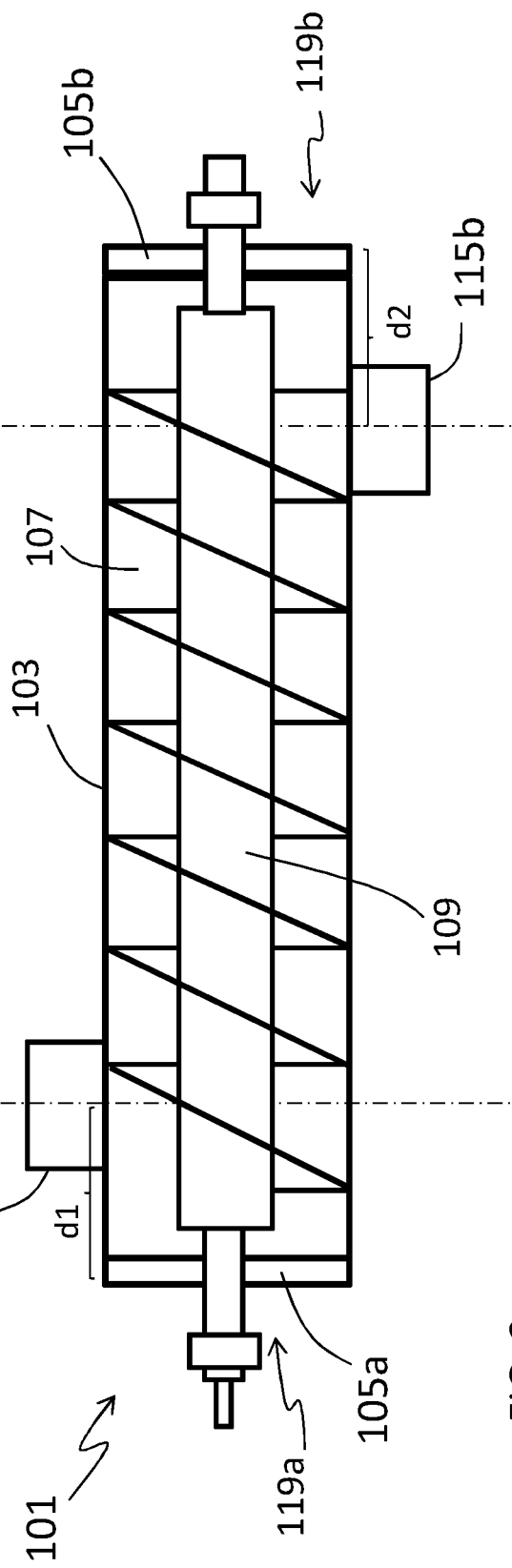
FIG. 2 shows schematically a reactor vessel with flat gables according to prior art.

For comparison, FIG. 2 shows schematically a reactor vessel 101 according to prior art. The reactor vessel comprises a tubular vessel part 103 and two flat gables 105a, 105b. The gables 105a, 105b are connected one to each end of the tubular part 103, hereby enclosing a vessel internal compartment 107. A central shaft 109 is provided within the vessel internal compartment 107 extending between the two gables 105a, 105b. This could as described above be a material transporting screw. Furthermore, as described above in relation to FIG. 1, the reactor vessel comprises an inlet 115a provided at a distance d1 from a first end 119a of the tubular vessel part 103 and an outlet 115b provided at a distance d2 from a second opposite end 119b of the tubular vessel part 103. For a pressurized reactor vessel these flat gables 105a, 105b need to be rather thick for withstanding the pressure. For large reactors with high internal pressure for treating the biomass material a flat gable could for example need to be as thick as 200 mm and thus it is very heavy. A dished gable for the same size of reactor vessel can be made much thinner and still resist the same pressure, maybe as thin as around 25 mm, and will therefore save a lot of weight. Hereby a reactor vessel according to the invention with at least one of the gables inwardly dished can be made much lighter and is therefore easier to handle, move and transport.

Another advantage with the present invention which is apparent when comparing FIG. 1 and FIG. 2 is that with both gables inwardly dished the central shaft 9 provided along a central axis, A, extending between the two gables 5a, 5b inside the elongated reactor vessel 1 can be made shorter. The central shaft 9 needs to extend though the whole vessel internal compartment 7 and protrude out through at least one of the gables 5a, 5b for control of the shaft rotation. With inwardly dished gables instead of flat gables the shaft 9 can be made shorter and a shorter shaft will be less prone to deflect and can therefore be made with a smaller diameter. A smaller diameter of the shaft will give a larger effective internal volume of the reactor vessel which is suitable for an effective process. The effective internal volume of the reactor vessel can be defined to be the part of the vessel internal compartment 7 provided between the inlet 15a and the outlet 15b of said reactor vessel 1. More exact the volume can be measured from the first position 17a to the second position 17b as shown by dotted lines in both FIG. 1 and FIG. 2. Hereby it is clear that the inwardly dished gables do not decrease the effective internal volume of the reactor vessel. However, instead the smaller diameter of the central shaft 9 as compared to the diameter of the central shaft 109 in FIG. 2 will contribute to a larger effective internal volume. Furthermore, with a smaller diameter of the central shaft 9 production costs will be decreased for both the shaft and also for sealings and bearings for the shaft mounting through the gables 5a, 5b.

The reactor vessel according to the invention can be substantially cylindrical and in one embodiment of the invention at least 1 m in diameter and at least 6 m in length. In another embodiment of the invention the reactor vessel can be at least 1.5 m in diameter and at least 8 m in length or at least 2.5 m in diameter and at least 10 m in length.

A shape of the at least one inwardly dished gable can in one embodiment of the invention be hemispherical elliptical and in another embodiment of the invention spherical.

A top point 21a of the first end vessel gable 5a and a top point 21b of the second end vessel gable 5b are the parts of the dished gables 5a, 5b provided furthest in to the vessel internal compartment 7. The top point 21a of the first end vessel gable 5a is suitably located between an inlet centerline 16a and the first end 19a of the tubular vessel part 3, wherein said inlet center line 16a is passing through a center of the inlet 15a of the reactor and is perpendicular to the central axis (A). The top point 21b of the second end vessel gable 5b is suitably located between an outlet centerline 16b and the second end 19b of the tubular vessel part 3, wherein said outlet center line 16b is passing through a center of the outlet 15b of the reactor and is perpendicular to the central axis (A). Hereby the dished gables will not affect the effective internal volume of the reactor vessel 1.

In one embodiment of the invention a distance between the top point 21a of the first end vessel gable 5a and the first end 19a of the tubular vessel part 3 and a distance between the top point 21b of the second end vessel gable 5b and the second end 19b of the tubular vessel part 3 are at least ⅓ of a radius of the reactor vessel.

The invention claimed is:

1. An elongated pressurized reactor vessel for biomass material, the elongated pressurized reactor vessel comprising:
    a substantially tubular vessel part comprising:
        a first end, and
        a second end;
    a first gable connected to the first end, the first gable being inwardly dished;
    a second gable connected to the second end, the second gable cooperating with the substantially tubular vessel part and the first gable to enclose a vessel internal compartment, the second gable being inwardly dished;
    a material transporting screw configured for transporting the biomass material through the elongated pressurized reactor vessel, the material transporting screw comprising:
        a central shaft provided within the vessel internal compartment, extending between the first gable and the second gable along a central axis, and protruding out of the vessel internal compartment through at least one of the first gable or the second gable, the central shaft being configured to be connected to a rotation device that is configured to rotate the central shaft around its longitudinal axis, and
        a screw flight provided around the central shaft;
    a first bearing mounted on the first gable and supporting the central shaft, the first bearing facilitating rotation of the central shaft around its longitudinal axis; and
    a second bearing mounted on the second gable and supporting the central shaft, the second bearing facilitating rotation of the central shaft around its longitudinal axis.

2. The elongated pressurized reactor vessel of claim 1, further comprising:
    an inlet for receiving the biomass material into the vessel internal compartment, the inlet being located at a first position, which is closer to the first end than the second end; and
    an outlet for discharging the biomass material out from the vessel internal compartment after having passed through the vessel internal compartment, the outlet being located at a second position which is closer to the second end than the first end.

3. The elongated pressurized reactor vessel of claim 2, wherein the first position is provided at a first distance from the first end and the second position is provided at a second distance from the second end.

4. The elongated pressurized reactor vessel of claim 3, wherein the first distance and the second distance are at least 1/20 of a total length of the elongated pressurized reactor vessel.

5. The elongated pressurized reactor vessel of claim 1, wherein a pressure within the vessel internal compartment is 5-50 bar (g).

6. The elongated pressurized reactor vessel of claim 1, wherein the elongated pressurized reactor vessel is horizontally provided.

7. The elongated pressurized reactor vessel of claim 1, wherein the elongated pressurized reactor vessel is substantially cylindrical and at least 1 m in diameter and at least 6 m in length.

8. The elongated pressurized reactor vessel of claim 1, wherein a shape of each of the first gable and the second gable is hemispherical, elliptical, or spherical.

9. The elongated pressurized reactor vessel of claim 1, wherein:
a first top point of the first gable is located between an inlet centerline and the first end, the inlet centerline passing through a center of an inlet of the elongated pressurized reactor vessel and being perpendicular to the central axis; and
a second top point of the second gable is located between an outlet centerline and the second end, the outlet centerline passing through a center of an outlet of the elongated pressurized reactor vessel and being perpendicular to the central axis.

10. The elongated pressurized reactor vessel of claim 9, wherein a first distance between the first top point and the first end and a second distance between the second top point and the second end are equal to at least 1/3 of a radius of the elongated pressurized reactor vessel.

11. The elongated pressurized reactor vessel of claim 1, further comprising:
an inlet for receiving the biomass material into the vessel internal compartment, the inlet being located at a first position, which is closer to the first end than the second end; and
an outlet for discharging the biomass material out from the vessel internal compartment after having passed through the vessel internal compartment, the outlet being located at a second position which is closer to the second end than the first end;
wherein the first position is provided at a first distance from the first end and the second position is provided at a second distance from the second end;
wherein the first distance and the second distances are at least 1/20 of a total length of the elongated pressurized reactor vessel; and
wherein the elongated pressurized reactor vessel is substantially cylindrical and at least 1 m in diameter and at least 6 m in length.

12. The elongated pressurized reactor vessel of claim 1, further comprising:
an inlet for receiving the biomass material into the vessel internal compartment, the inlet being located at a first position, which is closer to the first end than the second end; and
an outlet for discharging the biomass material out from the vessel internal compartment after having passed through the vessel internal compartment, the outlet being located at a second position which is closer to the second end than the first end;
wherein the first position is provided at a first distance from the first end and the second position is provided at a second distance from the second end;
wherein the first distance and the second distances are at least 1/20 of a total length of the elongated pressurized reactor vessel;
wherein a first top point of the first gable is located between an inlet centerline and the first end, the inlet centerline passing through a center of the inlet and being perpendicular to the central axis; and
wherein a second top point of the second gable is located between an outlet centerline and the second end, the outlet centerline passing through a center of the outlet and being perpendicular to the central axis.

13. The elongated pressurized reactor vessel of claim 12, wherein a third distance between the first top point and the first end and a fourth distance between the second top point and the second end are equal to at least 1/3 of a radius of the elongated pressurized reactor vessel.

14. The elongated pressurized reactor vessel of claim 13, wherein a pressure within the vessel internal compartment is 5-50 bar (g).

15. The elongated pressurized reactor vessel of claim 14, wherein the elongated pressurized reactor vessel is substantially cylindrical.

16. The elongated pressurized reactor vessel of claim 15, wherein the elongated pressurized reactor vessel is at least 1 m in diameter.

17. The elongated pressurized reactor vessel of claim 15, wherein the elongated pressurized reactor vessel is at least 6 m in length.

18. The elongated pressurized reactor vessel of claim 13, wherein the elongated pressurized reactor vessel is substantially cylindrical.

19. The elongated pressurized reactor vessel of claim 1, wherein a shape of each of the first gable and the second gable is elliptical.

20. The elongated pressurized reactor vessel of claim 1, wherein a shape of each of the first gable and the second gable is spherical.

* * * * *